United States Patent [19]

Caspar et al.

[11] 4,222,784
[45] Sep. 16, 1980

[54] NOVEL BINDER AND ITS UTILIZATION FOR PREPARING QUICK-SETTING MORTARS AND MICROCONCRETES

[75] Inventors: Jean-Pierre Caspar, Le Teil Ardeche; Jacques Gaillard, Villeneuve de Berg Ardeche, both of France

[73] Assignee: Lafarge, Paris, France

[21] Appl. No.: 848,277

[22] Filed: Nov. 2, 1977

[30] Foreign Application Priority Data

Nov. 15, 1976 [FR] France .................. 76 34248

[51] Int. Cl.² ........................................ C04B 7/353
[52] U.S. Cl. ........................ 106/93; 106/97; 106/104
[58] Field of Search ............. 106/90, 93, 104, 97

[56] References Cited

U.S. PATENT DOCUMENTS

| | | | |
|---|---|---|---|
| 3,030,258 | 4/1962 | Wagner | 106/93 |
| 3,491,049 | 1/1970 | Gibson et al. | 106/104 |
| 3,788,869 | 1/1974 | Batdorf et al. | 106/93 |
| 3,824,107 | 7/1974 | Weiant | 106/93 |
| 3,997,353 | 12/1976 | Chervenka et al. | 106/90 |

*Primary Examiner*—James Poer
*Attorney, Agent, or Firm*—Burgess, Ryan and Wayne

[57] ABSTRACT

A binder for producing mortars or micro-concretes containing, by weight, 87% CPA 400 or CPA 500 cement, 13 to 19% aluminous cement and 0.1 to 1.0% of an organic agent. The mortars and micro-concretes prepared by means of said binder are adapted to spraying, in the moist state, or trowelling onto vertical, inclined or horizontal supports without any particular precautionary measure.

4 Claims, No Drawings

NOVEL BINDER AND ITS UTILIZATION FOR PREPARING QUICK-SETTING MORTARS AND MICROCONCRETES

The present invention is directed to a novel binder and its use in the preparing of quick-setting mortars and micro-concretes sprayable onto a support. The invention is also directed to the mortars and micro-concretes obtained by means of the said binder.

The mortars and micro-concretes, obtained in accordance with the present invention are quick-setting and their setting-time substantially corresponds to that of the initial binder, furthermore they are perfectly adapted to mechanical spraying, in the form of a moist paste, or trowelling, so as to form comparatively thick layers, without any particular precautionary measures, by a single operation, on inclined or vertical supports. The mortars and micro-concretes according to the invention may be used advantageously to produce thin films by mechanical spraying in a single operation, which constitutes a surprising advantage of considerable interest. These mortars and micro-concretes indeed allow construction systems to be accomplished rapidly, with extremely easy assembling, using most economic means, which results in a considerable decrease in manpower and time, as compared with the manpower and time required when conventional techniques are used. The products of the type described hereinabove are not only of great technical and economical interest per se, but furthermore it must be noted that the method of spraying of said products in the form of a moist paste, which can be carried out when the products according to the invention are used, is more easily performed than the methods of "dry spraying" conventionally used.

One of the most advantageous features of the mortars and micro-concretes, according to the present invention, resides in the fact that they make it possible to apply comparatively thick layers in a single operation, onto inclined supports as well as onto vertical ones. Thus, layers having a thickness of 3 to 5 cm are easily obtainted on vertical supports, while it is possible to form layers having a thickness of 2 cm by spraying on horizontal supports such as ceilings. With the concretes or mortars according to the invention, it is possible to produce thin films having a thickness of 3 to 6 cm by mechanical spraying in a single operation.

In point of fact, the advantage of the mortars and micro-concretes, according to the invention, resides in the fact that they allow the the application of single operation techniques, which lead to construction systems being carried out rapidly, requiring only very simple assemblies (trellis) and allowing considerable economy of manpower, which leads to an economy in time, manpower and construction means.

The present invention is directed to a binder as a novel industrial product which has the following composition, expressed by weight:
CPA 400 or 500=80–87%
aluminous cement=13–19%
organic agent=0.01–1.0%, preferably 0.02–0.7%

By CPA 400 or 500 is meant, in accordance with the French Standard NF 15-302 definition, Portland cements having a minimum compressional strength of 400 or 500 bars, respectively, after 28 days.

According to one embodiment of the invention, the aluminous cement is a cement containing 35–40% alumina. This cement may be, among others, a cement of the FONDU ® or SECAR ® type, these commercial designations correspond to aluminous cements manufactured and sold by the French Company LAFARGE.

In another embodiment of the invention, this organic agent is a rheologic and water-retaining agent and consists preferably of a compound selected from the group comprising methylcellulose, carboxymethylcellulose hydroxyethylcellulose, cellulose ether and cellulose starches. According to another embodiment of the invention, methyl cellulose is used, and a particularly suitable methyl cellulose is the one sold by the Company HOECHST under the commercial designation of "TYLOSE ® MH 2000×p".

The aluminous cement is preferably a cement which does not contain more than 40% alumina.

Naturally, the proportion of the organic agent to be used, while being within the above-indicated range, will be determined by those skilled in the art taking into account the activity of said agent, i.e. its influence on the setting time, and taking into account the rheological stresses associated with the technique of spraying the moist pastes which are used.

Thus the following requirements must be met:
the spreading value on impact test table 3 minutes after mixing should preferably be between 180 and 200 mm;
the rheological properties between the mixing and the beginning of setting should be stable and thus correspond to a spreading value equal to, or lower than, 150 mm.

The present invention is also related to the use of the above-mentioned binders for producing mortars, especially sprayable ones. The invention concerns mortars produced from the above mentioned binder with granulated substances, preferably calcareous substances, and it concerns, more particularly, mortars containing at least 25% binders; preferably 25–35% binders and 75–65% granulated calcareous substances, and more precisely 27–33% binder and 67–72% granulated calcareous substances.

Preferably, the granulometric properties of said granulated substances are such that the entire bulk of the granulated substances has a grain diameter lower than 4 mm and preferably lower than 2 mm.

It must be pointed out that granulated substances containing sulphates (gypsum, anhydrite) should not be used when carrying out the present invention, since they may initiate undesirable interactions in the presence of water. Indeed, these sulphate-based granulated substances lead to the formation of hydrous calcium sulphoaluminates (hydrous calcium monosulphoaluminate and calcium tri-sulphoaluminate) which can result in detrimental swelling phenomena.

The present invention is further directed to the use of the above mentioned binders for producing micro-concretes, and more particularly, sprayable micro-concretes. These micro-concretes are obtained by adding, to the above-mentioned binder-made mortars, an equivalent volume of filling material, the particles of which have a diameter varying between 5 and 7 mm.

The invention will be described hereinafter in a more detailed manner by means of several examples which are given by way of illustration, but not of limitation.

EXAMPLE 1

A binder was prepared by mixing the following constitutents (the amounts of which are indicated in weight):

83.6% CPA 400, 16.4% aluminous cement sold under the commercial designation of "FONDU" ® by the Company Lafarge and consisting of a melted aluminous cement, with an alumina content of about 35%, 0.1% methylcellulose (commercial designation TYLOSE ® MH-2000×p).

The powder thus obtained had the following properties:

Density=1
Mixing ratio=0.34
Start of setting=15 mn.
End of setting=45 mn.
Mechanical strength properties, in kg/cm$^2$:

|  | Bending strength | Compression strength |
|---|---|---|
| after 6 hours | 10 | 22 |
| after 24 hours | 17 | 163 |

EXAMPLE 2

A mortar was prepared containing:
31% binder according to Example 1, and
69% in weight of calcareous granulated substances.

This mortar exhibited the mechanical properties listed by the appended Table 1. This mortar is perfectly adapted to mechanical spraying, in the form of a moist paste. It may also be applied by means of a trowel, which was proved by relevant tests. These tests have shown indeed that it is possible to produce thick layers without any particular precautionary measures.

EXAMPLE 3

A micro-concrete was prepared containing:
100 parts by volume of the mortar according to Example 2, and
100 parts by volume of granulated substances, the particles of which had a diameter varying between 5 and 7 mm.

This micro-concrete is perfectly adapted to mechanical spraying or trowelling with a view to producing thick layers, without any particular precautionary measures.

The mechanical performances of these micro-concretes, in addition to their short setting times which were similar to those of the starting binder, are as follows (as measured on cylindeers of 11×28 cm):

Compression strength:
2 days: 195 bars,
7 days: 256 bars,
18 days: 310 bars.

TABLE 1

| Mechanical properties of the mortar according to Example 2 | |
|---|---|
| Aspect | granulous powder |
| Density of the powder | 1.46 |
| Mixing ratio* | 18% |
| Start of setting | 1h30 |
| End of setting | 4–5h |
| Spreading on impact test table (rheology) | 185 mm |
| Shrinking | 45 days − 1200 μm/m |
| Swelling (immersion in water) | 45 days + 180 μm/m |
| Mechanical strength $R^F/R^C$** | |
| - 24 hours | 32/129 bars |
| - 7 days | 50/304 bars |
| - 28 days | 65/352 bars |
| Density | 2.0 |
| Colour | grey |

TABLE 1-continued

| Mechanical properties of the mortar according to Example 2 | |
|---|---|
| pH | alkaline |
| Behaviour in the presence of water***: | |
| - permeability | no stain |
| - % of water | <3% |
| Resistance to heavy impact**** | mm |

NOTES -
*In situ, the product such as plaster is consequently mixed without any specific addition of granulated substances or sand.
**$R^F/R^C$ = Bending strength/compression strength
***Water penetration after 24 hours: a 1000 g water column being maintained in contact with the material, the penetration is observed on the backside of a 6 cm wall, and the adsorbed amount of water is measured.
****Impression left after 7 days by a ball weighing 500 g and having an impact energy of 2.5 joules.

EXAMPLE 4

With a view to showing the advantages of the products according to the invention, which reside in their aptitude to spraying in the moist state, tests were performed, using various conventional machines provided with piston pumps or peristaltic pumps.

The spraying tests were carried out on supports of the STUCANET ® type (commercial designation) with supporting cardboard, the NERLAT ® type (commercial designation) or the NERGALTO ® type (commercial designation).

As far as satisfactory adhering is concerned, the best results were obtained with the STUCANET ® support.

It is also possible to spray, the mortars and micro-concretes, according to the invention, onto a rigid support such as a plaster board wall or a smooth surface parpen concrete wall.

These mortars and micro-concretes can be sprayed onto vertical, inclined or horizontal supports to form layers of a thickness of up to 3 to 6 cm.

By "STUCANET" ® is meant supports sold by the Company BEKAERT, which are made up of a galvanized grid with a supporting cardboard, while by "NERLAT" ® or "NERGALTO" ® is meant a stretched metallic network or trellis which is not necessarily galvanized.

The invention is not limited to the contents of the description herein above; many modifications and variants may be envisaged within the scope of the invention as defined by the appended claims.

What is claimed is:

1. A binder consisting essentially of 80 to 87% by weight of a Portland cement corresponding to French Standard CPA 400 or CPA 500, 13 to 19% by weight of aluminous cement and 0.01 to 1.0% by weight of an organic rheological and water-retaining agent selected from the group consisting of methylcellulose, carboxymethylcellulose, hydroxyethylcellulose, cellulose ether and cellulose starches, said binder producing on the impact test table a spreading of about 180 to 200 mm three minutes after mixing with water.

2. The binder of claim 1, wherein said organic agent is methylcellulose with retarded dissolution, the aqueous solution at 2% has a viscosity of about 2000 to 3000 centipoises, as measured by means of the Brookfield viscometer.

3. A composition comprising a binder as claimed in claim 1 and 75 to 65% by weight of calcareous granulated substances having in their entirety a particle size smaller than 4 mm, the percent by weight being based on the total weight of binder and calcareous substances.

4. The composition of claim 3 additionally containing, in substantially equivalent volumes, a granulated substance having a particle size between 5 and 7 mm.

* * * * *

UNITED STATES PATENT OFFICE
CERTIFICATE OF CORRECTION

Patent No. 4,222,784                    Dated  September 16, 1980

Inventor(s)    Jean-Pierre Caspar, et al

It is certified that error appears in the above-identified patent and that said Letters Patent are hereby corrected as shown below:

Column 1, line 42: "obtainted" should be --obtained--.

Column 3, line 48: "cylindeers" should be --cylinders--.

Column 4, Table 1, line 7: "mm" should be --7mm--.

Signed and Sealed this

Sixth Day of January 1981

[SEAL]

Attest:

SIDNEY A. DIAMOND

Attesting Officer       Commissioner of Patents and Trademarks